UNITED STATES PATENT OFFICE.

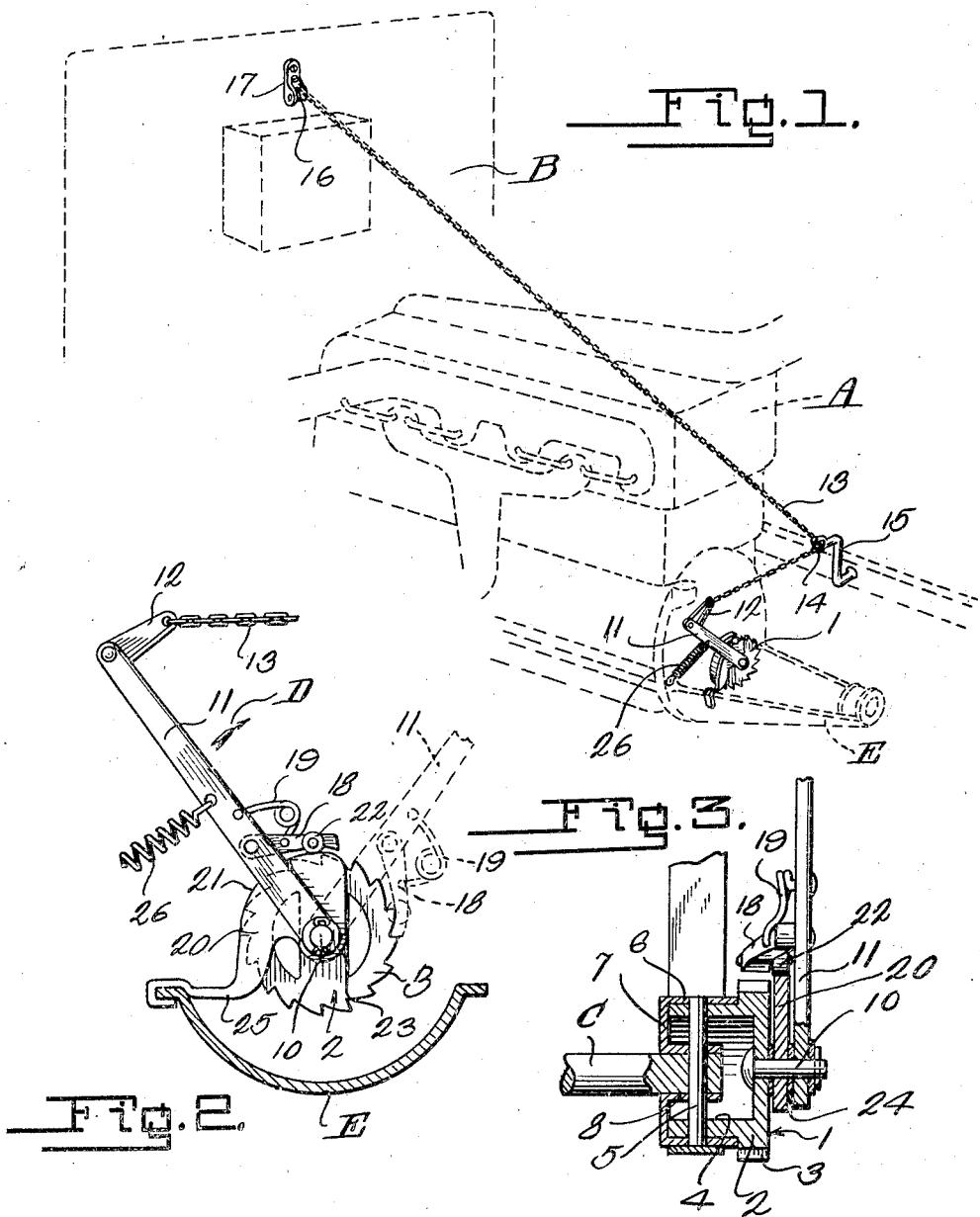

ELLIS J. BENNETT, OF ALBION, ILLINOIS.

MECHANICAL STARTER FOR MOTOR-VEHICLES.

1,358,697.  Specification of Letters Patent.  Patented Nov. 16, 1920.

Application filed October 5, 1918. Serial No. 257,050.

*To all whom it may concern:*

Be it known that I, ELLIS J. BENNETT, a citizen of the United States, and resident of Albion, in the county of Edwards and State of Illinois, have invented certain new and useful Improvements in Mechanical Starters for Motor-Vehicles, of which the following is a specification.

This invention relates to a mechanical starter for engines of motor vehicles and is particularly designed for use in connection with "Ford" automobiles, an object of the invention being to provide a mechanical starter which may operated from the driver's seat of the automobile for cranking the engine to start the same, which mechanical starter is simple in construction, durable and which in view of its simplicity may be manufactured for a relatively small sum.

A further object of this invention is to provide means to prevent breakage of any of the parts of the self starter, in case the engine back-fires, the said means comprising a guard having a cam surface of greater radius than the rotating ratchet which rotates the crank shaft of the engine, and which cam surface is engaged by a roller carried by the ratchet rotated pawl for moving the pawl out of engagement with the peripheral teeth of the ratchet to disconnect the ratchet and pawl when the engine back-fires.

Other objects of the invention will appear in the following detailed description, taken in connection with the accompanying drawing, forming a part of this specification, and in which drawing:

Figure 1 is a perspective view of the improved mechanical starter showing the same applied.

Fig. 2 is a side elevation of the starter, and

Fig. 3 is a fragmentary section through the starter.

Referring more particularly to the drawings, A indicates the engine of an automobile, and B indicates the dash. The engine A has the usual type of crank shaft C, which is initially rotated by the mechanical starter mechanism generically indicated by the numeral 1 to start the engine A.

The mechanical starter 1 comprises a ratchet 2 which has the usual type of peripheral ratchet teeth 3 upon its periphery and which also has a sleeve 4 formed thereon and extending laterally from one side of the ratchet. The sleeve 4 is connected, by means of a pin 5 to the outer flange 6 of the flanged member 7. The flanged member or disk 7 has an inner flange or collar 8 formed thereon which fits snugly about the end of the crank shaft C and which is connected to the crank shaft by the pin 5, as clearly shown in Fig 3 of the drawing, for rotating the crank shaft upon rotation of the ratchet 2.

A pin 10 is carried by the ratchet and projects outwardly from the outer face thereof, having its edges alining with the edges of the crank shaft C and also the edges of the ratchet 2. The pin 10 has a lever 11 mounted thereon, the outer end of which lever has an arm 12 attached thereto. A chain 13 is connected to the arm 12 and passes over a suitable guide pulley 14 which is carried by a supporting bracket 15. The supporting bracket 15 may be attached in any suitable manner to any convenient part of the chassis of the automobile or motor vehicle. The chain 13, passes from the guiding pulley 14 upwardly over the engine A, and over a guide pulley 16 which is carried by a suitable bracket 17. The bracket 17 is attached to the dash B of the automobile, so that, when the chain passes over the guide pulley 16 it is adapted to pass through the dash B and be positioned for convenient reach by the driver of the automobile, so that he may crank or start his engine from the driver's seat of the vehicle.

A lever 11 has a pawl 18 pivotally connected thereto, intermediate its ends which pawl is normally held in engagement with any one of the peripheral teeth 3 of the ratchet 2 by a spring 19 so that when the lever 11 is moved in the direction indicated by the arrow D in Fig. 2 of the drawing, and as shown in dotted lines in Fig. 2, the ratchet 2 will be rotated for imparting rotation to the shaft C for cranking the engine.

A guard 20 is provided to prevent the breaking of pawl, lever, or any part of the starter in case the engine back-fires. This guard 20 has a cam face 21 formed thereon the diameter of which is greater than the diameter of the ratchet 2. A roller 22 is carried by the pawl 18 and is positioned for riding over the cam surface 21, which will force the pawl 18 out of engagement with the teeth of the ratchet 2 upon the reverse rotation of the ratchet and consequently prevent breaking of any of the parts of the starter. The guard 20 has a depending bearing 23 formed thereon which engages over the pin 10 and which is held safe from engagement with the ratchet 2 and the lever 11 by suitable spacing collars 24. An arm 25 is also formed upon the guard member 20 and it has its outer free end bent to snugly engage over one of the edges of the pan E which is carried by all "Ford" engines, to hold the guard against movement.

A spring 26 is connected to the lever 11 and to the engine A, at any suitable point, this spring 26 returns the lever 11 to its normal position as shown in solid lines in Fig. 2, after it has been drawn over, for rotating the ratchet, by movement of the chain 13.

In operating the improved mechanical starter, the chain 13 is first drawn outwardly over the pulleys 14 and 16 which moves the lever 11 into the dotted line position, rotating the ratchet and consequently the crank shaft C; after the chain has been pulled to the limit of its outward movement, it is slacked and the spring 26 will return the lever to its normal position, so that upon again pulling the chain the ratchet will be rotated. This operation may be repeated until the engine starts properly. When the lever 11 is returned to its normal position, by the spring 26, the pawl 18 will be moved out of engagement with the ratchet teeth 3 of the ratchet 2, allowing the ratchet thereto to be rotated, freely without engagement with the pawl, when the engine starts operating or when the ratchet is rotated by the momentum of the rotation of the crank shaft.

Changes in details may be made without departing from the spirit of this invention, but;

I claim:

1. In a mechanical starter, for internal combustion engines, the combination, of a ratchet wheel, a lever, a pawl carried by the lever for engagement with the ratchet to rotate the latter upon pivotal movement of the lever in a forward direction, a guard plate having a cam surface concentric with the ratchet wheel and of greater radius than said ratchet, a roller carried by said pawl and adapted to engage the cam surface of said guard plate to move the pawl out of engagement with the ratchet immediately prior to the arresting of the reverse movement of said lever.

2. In a mechanical starter for internal combustion engines, the combination, of a ratchet, a lever, a spring controlled pawl carried by the lever for engagement with the ratchet to rotate the latter upon pivotal movement of the lever in a forward direction, a stationary guard plate having a cam surface of greater radius than the radius of said ratchet, a roller rotatably carried by the pawl for engagement with said cam surface to move the pawl out of engagement with the ratchet teeth during the reverse movement of the lever, and a spring connected to said lever for reversing the movement of the lever to return it to its normal position.

3. In a mechanical starter for internal combustion engines, the combination, of a ratchet, a lever, a spring controlled pawl carried by the lever for engagement with the ratchet to rotate the latter upon pivotal movement of the lever in a forward direction, a stationary guard plate having a cam surface of greater radius than the radius of said ratchet, a roller rotatably carried by the pawl for engagement with said cam surface to move the pawl out of engagement with the ratchet teeth during the reverse movement of the lever, a spring connected to said lever for reversing the movement of the lever to return it to its normal position, an arm attached to the free end of the lever, and a chain connected to said arm.

4. In a mechanical starter for internal combustion engines, the combination of a ratchet wheel, a lever, a pawl carried by said lever for engagement with the ratchet to rotate the ratchet by movement of the lever, a stationary guard plate positioned at one side of the ratchet and having a cam surface concentric with the ratchet wheel and of greater radius than the radius of the ratchet, said cam surface being slightly longer than a quarter of the circumference of the ratchet and means carried by said pawl for engagement with said cam surface to hold the pawl out of engagement with the ratchet during the part of each movement of the lever.

5. In a mechanical starter for internal combustion engines, the combination of a ratchet wheel, a lever, a pawl carried by the lever for engagement with the ratchet wheel to rotate the latter upon pivotal movement of the lever in a forward direction, a cam concentric with the ratchet wheel, and a roller carried by said pawl and adapted to roll over said cam to move the pawl out of engagement with the ratchet wheel immediately prior to arresting of reverse movement of the lever.

6. In a mechanical starter for internal combustion engines, the combination with the engine shaft of a ratchet wheel rotatable with said shaft, a stub shaft coaxial with and carried by said ratchet wheel, a lever pivoted to said stub shaft and a pawl carried by said lever for engagement with the teeth of said ratchet wheel to move the latter in one direction by movement of said lever, a guard supported by said stub shaft, said guard having a curved surface of greater radius struck from the axis of said stub shaft than the radius of said ratchet wheel, with a cam surface leading to said curved surface, and a member carried by said pawl for riding engagement on the said surfaces of said guard to lift the pawl from engagement with said ratchet wheel upon reverse movement of said lever.

ELLIS J. BENNETT.